July 18, 1950     D. D. COFFIN     2,515,632
CONDENSER CHARGING SYSTEM
Filed March 21, 1942
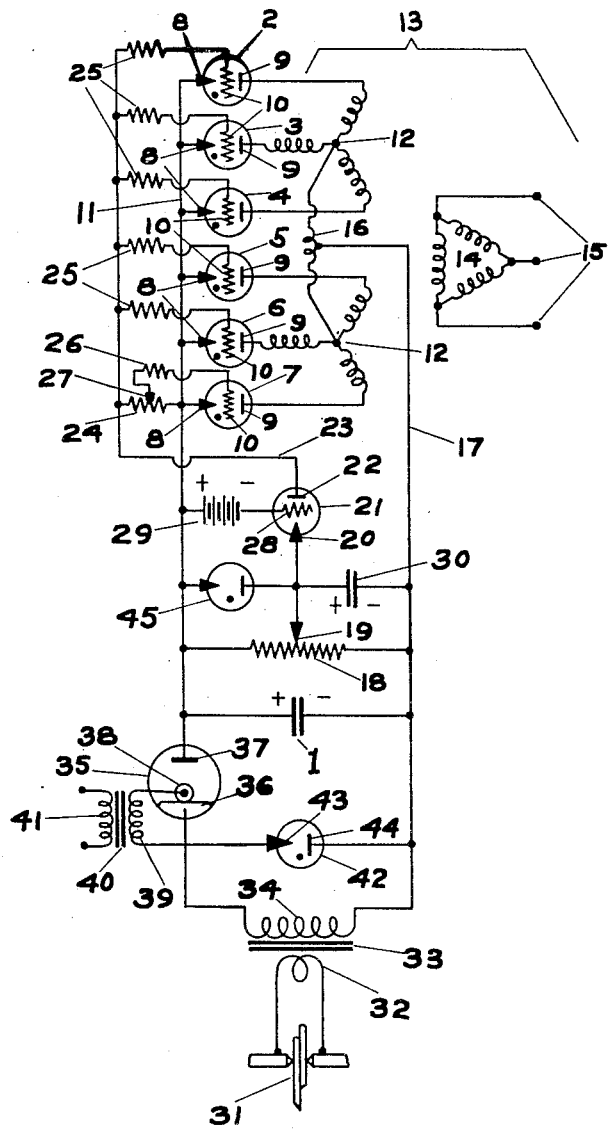
INVENTOR.
DAVID D. COFFIN,
BY Elmer J. Gorn
ATTY.

Patented July 18, 1950

2,515,632

UNITED STATES PATENT OFFICE 2,515,632

CONDENSER CHARGING SYSTEM

David D. Coffin, Waltham, Mass., assignor to Raytheon Manufacturing Company, Newton, Mass., a corporation of Delaware Application March 21, 1942, Serial No. 435,619

10 Claims. (Cl. 320—1)

This invention relates to a system for charging a condenser to a predetermined voltage. The charge in such a condenser may be used for any convenient purpose, such as resistance welding.

In systems of the above kind it is desirable that the charging of the condenser be automatically controlled so that the supply of charging current thereto is cut off when a predetermined desired voltage is attained. In systems where a rectifier is used to supply increments of charging current, there is often a tendency for the charging increments to be so large as to cause the final voltage on the condenser to overshoot said predetermined value. This tendency is particularly marked in a system adapted to charge varying sizes of condenser and where the smaller size of condenser is selected.

An object of this invention is to control the charging of a condenser in a system of the above kind in response to the rate of charging thereof.

Another object is to use such a control to prevent overcharging of the condenser.

A still further object is to utilize a control responsive to the rate of charging of the condenser to cut off the supply of charging current to said condenser when the desired voltage is reached.

The foregoing and other objects of this invention will be best understood from the following description of an exemplification thereof, reference being had to the accompanying drawing, wherein the single figure is a diagram of a system embodying my invention.

The system illustrated consists of a condenser 1 which is to be charged to a predetermined voltage. The charging current for the condenser is supplied from a plurality of controlled rectifiers 2—7. These controlled rectifiers may be of the gas or vapor-filled type having a control grid to determine the initiation of the discharge during a period when the anode is positive. Each of the rectifiers 2—7 contains a cathode 8 of the permanently-energized type, such as a thermionic filament, an anode 9, and a control grid 10. The cathodes 8 are connected to a common conductor 11 which in turn is connected to the positive side of the condenser 1. The anodes 9 are fed from a source of multiple-phase alternating current by being connected to the outer ends of the phase windings of two Y-connected secondary windings 12 of a transformer 13 having a delta-connected primary winding 14. The primary winding 14 is adapted to be energized through terminals 15 connected directly to a suitable three-phase alternating current supply line. The neutral points of the two secondary windings 12 are connected together through an inter-phase reactor 16 having a center tap connected to a conductor 17, constituting the negative charging line. Said conductor 17 is connected to the negative side of the condenser 1.

Across the condenser 1 is connected a potentiometer 18 which is provided with an adjustable tap 19 connected to the cathode 20 of a high vacuum tube 21 having an anode 22 connected to a conductor 23. The conductor 11 is connected to the conductor 23 through a resistance 24. Also each of the control grids 10 of the rectifiers 2—6 is connected to the conductor 23 through a relatively high resistance 25. Preferably the control grid 10 of the rectifier tube 7 is connected through a relatively high resistance 26 to a tap 27 on the resistance 24.

The tube 21 is provided with a control grid 28 connected through a bias voltage source 29 to the conductor 11. The bias voltage source may be a battery, or any other suitable source.

When the system thus far described is initially energized, the condenser 1 has no charge upon it, so that the grids 10 are substantially at cathode potential, and therefore tubes 2—7 start conducting current substantially whenever the anodes 9 become positive. Under these conditions a maximum amount of charging current is supplied to the condenser 1, and said condenser charges rapidly. During this time a portion of the voltage on the condenser 1 is impressed between the cathode 20 and grid 28 of the tube 21, so as to make the cathode 20 negative and the grid 28 positive. The characteristics of the tube 21 are such that the voltage on the grid 28 prevents any appreciable flow of current through said tube, until the voltage across the condenser 1 has risen to a predetermined value at which the voltage derived from the tap 19 on the potentiometer 18 overcomes the bias of the source 29 and permits the tube 21 to start conducting current. When said tube does start conducting current, the characteristics thereof are relatively sharp so that a substantial amount of current flows. Therefore when said condenser 1 reaches said predetermined value, the tube 21 starts conducting current, causing a substantial voltage drop to appear across the resistance 24. This voltage is impressed upon the control grids 10 of the tubes 2—6, so that these tubes stop conducting current, resulting in a considerably diminished flow of charging current to the condenser 1. The control grid 10 of tube 7, however, does not have impressed upon it the full voltage appearing across the resistance 24, but only a portion thereof, as determined by the setting of the tap 27. Therefore, when the voltage on the grids 10 of the tubes 2—6 is sufficient to extinguish said tubes, a lesser value of voltage is impressed on the control grid 10 of tube 7, and therefore said tube continues to conduct current after the tubes 2—6 have been extinguished. Thereupon, only the tube 7 supplies charging current to the condenser 1, and the voltage on said condenser approaches a final desired value at a diminished rate. During this period the voltage at the tap 19 increases with the increasing voltage on the condenser 1, causing an increased current flow through the tube 21 and its associated resistance 24. This causes an increased voltage drop across the resistance 24 which finally increases the bias on the control grid 10 of tube 7 to such an extent as to extinguish said tube, terminating all flow of charging current to the condenser.

The foregoing arrangement provides satisfactory control of the charging current for many purposes. However, particularly where the condenser 1 is considerably smaller than the maximum size of condenser which the system is designed to charge, there is a tendency for the voltage to which the condenser 1 is charged to overshoot the finally desired value. This is due largely to the fact that with a relatively small condenser, each increment of charging current supplied to the condenser 1 by the tubes 2—7, respectively, is so large that the final increment or increments may be sufficiently large to carry the charge of the condenser from a point below that at which the tube 21 operates to extinguish the charging current to a point substantially above said value. In other words, the rate at which the condenser 1 is charged is so rapid that the voltage thereon overshoots before the tube 21 can extinguish the charging current.

In order to provide means responsive to the charging rate of the condenser 1 so as to anticipate the final charge thereon, a condenser 30 is connected between the tap 19 and the negative conductor 17. It will be seen that this condenser 30 is likewise charged in series with the lower portion of the potentiometer 18 across the conductors 11 and 17. The values of the condenser 30 and of the resistance in series therewith are so chosen as to give said circuit a sufficiently long time constant, so that if the condenser 1 charges at an excessive rate, the condenser 30 does not reach the voltage of the condenser 1 within the time interval from the beginning of one current-charging increment to the beginning of the next current-charging increment. The time constant, however, is sufficiently low so that if the rate of charge of the condenser 1 is below a predetermined value, the voltage on the condenser 30 will substantially follow the voltage on the condenser 1. This condition will be reached, for example, if the voltage on the condenser 30 reaches the voltage on the condenser 1 within the period from the beginning of one charging-current increment to the beginning of the next charging-current increment.

When the charging rate of the condenser 1 exceeds the predetermined value as described above, the voltage across the condenser 30 becomes successively less than the voltage across the condenser 1. Thus the point 19, instead of assuming a voltage dependent upon its position along the potentiometer 18, will assume a voltage which is closer to that of the negative conductor 17. It will be seen that this makes the cathode 20 more negative than it normally would be, and thus accelerates the firing of the tube 21 and the cutting off of the tubes 2—7. The provision of the condenser 30, therefore, accelerates the stoppage of charging current whenever the charging rate of the condenser 1 exceeds a predetermined value, which would be sufficient to cause the voltage on the condenser 1 to overshoot in absence of such an accelerated action.

When the action of the condenser 30 causes accelerated operation of the tube 21, the tube 7 may continue to supply small increments of charging current to the condenser 1 to bring it to the finally desired value of voltage, as described above. In some instances, however, the action of the tube 21 may be sufficient to cut off the tubes 2—7 until the charge on the condenser 30 catches up with the charge on the condenser 1 when the current through the tube 21 may be reduced somewhat so as to permit the tube 7 to then come into operation to supply the final increments of charging current.

As previously stated, the energy stored in the condenser 1 may be used for any suitable purpose as, for example, a resistance welding load 31. This load may be connected to the secondary winding 32 of a welding transformer 33 having a primary winding 34 which may be connected to the charged condenser 1 through a controlled ignition tube 35. This tube may be provided with a pool type mercury cathode 36, an anode 37, and an igniting electrode 38 adapted to initiate an arc spot on the cathode 36. An igniting impulse may be supplied to the igniting electrode 38 through the secondary winding 39 of an igniting transformer 40 having a primary winding 41 connected to a suitable source of igniting impulses. A high current rectifier tube 42 having a permanently energized type of cathode 43 and an anode 44 may be connected across the primary winding 34, as illustrated, for the purpose described and claimed in a copending application of John W. Dawson, Serial No. 309,124, filed December 14, 1939, now Patent No. 2,508,103, dated May 16, 1950.

When the igniter 38 is supplied with an igniting impulse, the tube 35 is ignited and causes the condenser 1 to discharge into the welding load 31. As this discharge takes place, the voltage across the condenser 1 falls to zero and reverses slightly, whereupon the rectifier tube 42 starts to conduct current and prevents any further charge of the condenser 1 in the inverse direction. When the tube 42 starts to conduct current, the tube 35 is extinguished. In this way a substantially unidirectional pulse of welding current is supplied to the welding load 31.

When the condenser 1 is discharged as described above, the condenser 30 in absence of additional means would discharge relatively slowly through the potentiometer 18, and might not be wholly discharged when it was again desired to start charging condenser 1. In order to supply an accelerated discharge path for the condenser 30, a rectifier tube 45 is provided with its anode connected to the point 19 and its cathode connected to the conductor 11. Preferably the tube 45 is of the gas or vapor type having a permanently energized type of cathode. Thus when the condenser 1 is discharged, as described above, the voltage across the condenser 30 predominates. It will be seen that this voltage is in a direction to cause conduction of current through the tube 45. This tube will, therefore, start conducting current, and the condenser 30 discharges through said tube into the condenser 1, delivering the charge of the condenser 30 to said condenser 1 in the desired direction to which the condenser 1 is to be charged for the next operation. The condenser 30, however, is preferably so much smaller than the condenser 1 that the discharge of the condenser 30 reduces the voltage thereon to a negligible value in so far as the succeeding operation of the system is concerned.

Of course it is to be understood that this invention is not limited to the particular details as described above as many equivalents will suggest themselves to those skilled in the art. For example, in some instances the provision of a final charging tube 7 to supply decreased increments of charging current may be eliminated, and other means, such as delayed firing of all the tubes, might be provided in order to control the final charging of the condenser 1. Various other types of charging current supply circuits may be utilized as well as other types of loads to which the discharge of the condenser may be applied. Other equivalents will suggest themselves to those skilled in the art. It is accordingly desired that the appended claims be given a broad interpretation commensurate with the scope of the invention within the art.

What is claimed is:

1. A system comprising a condenser, means for supplying charging current to said condenser, means responsive to the voltage on said condenser for cutting off the supply of charging current to said condenser when said voltage has risen to a predetermined value, and means responsive to the rate of charging of said condenser for advancing the normal operating point of said last-named means in accordance with said rate of charging.

2. A system comprising a condenser, means for supplying charging current to said condenser, means responsive to the voltage on said condenser for cutting off the supply of charging current to said condenser when said voltage has risen to a predetermined value, and means responsive to the rate of charging of said condenser for advancing the normal operating point of said last-named means when said rate of charging exceeds a predetermined value.

3. A system comprising a condenser, rectifying means for supplying charging current to said condenser, said rectifying means comprising a rectifying space discharge tube through which the discharge is controlled by a control electrode, means for impressing a discharge-inhibiting voltage on said control electrode when the voltage on said condenser has risen to a predetermined value, and means responsive to the rate of charging of said condenser for advancing the normal operating point of said last-named means in accordance with said rate of charging.

4. A system comprising a condenser, rectifying means for supplying charging current to said condenser, said rectifying means supplying an increment of charge to said condenser for each period of conduction of said rectifying means, means responsive to the voltage on said condenser for cutting off the supply of charging current to said condenser when said voltage has risen to a predetermined value, and means responsive to the magnitude of said increments for advancing the normal operating point of said last-named means in accordance with the size of said increments.

5. A system comprising a condenser, rectifying means for supplying charging current to said condenser, said rectifying means supplying an increment of charge to said condenser for each period of conduction of said rectifying means, means responsive to the voltage on said condenser for cutting off the supplying of charging current to said condenser when said voltage has risen to a predetermined value, and means responsive to the magnitude of said increments for advancing the normal operating point of said last-named means when the size of said increments exceeds a predetermined value.

6. A system comprising a condenser, means for supplying charging current to said condenser through a charging circuit, said charging circuit having a predetermined time constant, means responsive to the voltage on said condenser for cutting off the supply of charging current to said condenser when said voltage has risen to a predetermined value, and means responsive to the rate of charging of said condenser for advancing the normal operating point of said last-named means in accordance with said rate of charging, said last-named means including a circuit including an auxiliary condenser connected across said first-named condenser, the time constant of said last-named circuit being substantially less than that of said charging circuit.

7. A system comprising a condenser, means for supplying charging current to said condenser, a potentiometer connected across said condenser, an auxiliary condenser connected across a portion of said potentiometer, and means responsive to the voltage across another portion of said potentiometer to cut off the supply of charging current to the first-mentioned condenser when said voltage reaches a predetermined value.

8. A system comprising a condenser, means for supplying charging current to said condenser through a charging circuit, said charging circuit having a predetermined time constant, means responsive to the voltage on said condenser for cutting off the supply of charging current to said condenser when said voltage has risen to a predetermined value, means responsive to the rate of charging of said condenser for advancing the normal operating point of said last-named means in accordance with said rate of charging, said last-named means including a circuit including an auxiliary condenser connected across said first-named condenser, the time constant of said last-named circuit being substantially less than that of said charging circuit, means for discharging said first-named condenser, and a discharge circuit for said auxiliary condenser operating upon the discharge of said first-named condenser with a substantially smaller time constant than the time constant of said circuit connected across said first-named condenser.

9. A system comprising a condenser, means for supplying charging current to said condenser, a potentiometer connected across said condenser, an auxiliary condenser connected across a portion of said potentiometer, whereby said auxiliary condenser is charged through a portion of said potentiometer, the charging circuit thus formed for said auxiliary circuit having a relatively large time constant, means for discharging said first-named condenser, and a discharge circuit for said auxiliary condenser operating upon the discharge of said first-named condenser with a relatively small time constant.

10. A system comprising a condenser, means for supplying charging current to said condenser, a potentiometer connected across said condenser, an auxiliary condenser connected in series with a rectifier across said first-named condenser, said rectifier having a polarity to oppose flow of current during charging of said condenser, the point intermediate said auxiliary condenser and said rectifier being connected to an intermediate point on said potentiometer, means responsive to the voltage of said intermediate point to cut off the supply of charging current to the first-mentioned condenser when said voltage reaches a predetermined value, and means for discharging said first-named condenser.

DAVID D. COFFIN.

REFERENCES CITED

The following references are of record in the file of this patent:

UNITED STATES PATENTS

| Number | Name | Date |
| --- | --- | --- |
| 2,126,243 | Busse et al. | Aug. 9, 1938 |